US008428620B2

(12) United States Patent  (10) Patent No.: US 8,428,620 B2
Sweeney et al.  (45) Date of Patent: Apr. 23, 2013

(54) MASS TRANSPORTATION SERVICE DELIVERY PLATFORM

(75) Inventors: Jeffrey Sweeney, Olathe, KS (US); Kelsyn D. S. Rooks, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 445 days.

(21) Appl. No.: 12/428,051

(22) Filed: Apr. 22, 2009

(65) Prior Publication Data

US 2010/0273509 A1    Oct. 28, 2010

(51) Int. Cl.
*H04W 24/00* (2009.01)
(52) U.S. Cl.
USPC .................. 455/456.3; 455/456.1; 705/5
(58) Field of Classification Search ............... 455/456.3, 455/456.1; 705/5
See application file for complete search history.

(56) References Cited

U.S. PATENT DOCUMENTS

| | | | |
|---|---|---|---|
| 4,598,275 A | 7/1986 | Ross et al. | |
| 4,814,751 A | 3/1989 | Hawkins et al. | |
| 5,301,353 A | 4/1994 | Borras et al. | |
| 6,057,764 A | 5/2000 | Williams | |
| 6,327,535 B1 | 12/2001 | Evans et al. | |
| 6,331,817 B1 | 12/2001 | Goldberg | |
| 6,396,413 B2 | 5/2002 | Hines et al. | |
| 6,531,963 B1 | 3/2003 | Nyfelt | |
| 6,774,811 B2 | 8/2004 | Kaufman et al. | |
| 6,894,612 B2 | 5/2005 | Xydis | |
| 6,917,288 B2 | 7/2005 | Kimmel et al. | |
| 6,963,277 B2 | 11/2005 | Imasaki et al. | |
| 6,968,179 B1 | 11/2005 | DeVries | |
| 7,102,509 B1 | 9/2006 | Anders et al. | |
| 7,123,126 B2 | 10/2006 | Tanaka et al. | |
| 7,132,941 B2 | 11/2006 | Sherlock | |
| 7,138,920 B2 | 11/2006 | Nyfelt | |
| 7,142,122 B2 | 11/2006 | Butikofer et al. | |
| 7,149,297 B2 | 12/2006 | Idoni et al. | |
| 7,167,094 B2 | 1/2007 | Ciarcia et al. | |
| 7,203,674 B2 | 4/2007 | Cohen | |
| 7,218,930 B2 | 5/2007 | Ko et al. | |
| 7,275,689 B2 * | 10/2007 | Mak .............................. 235/384 |
| 7,286,158 B1 | 10/2007 | Griebenow | |
| 7,286,837 B2 | 10/2007 | Giniger et al. | |
| 7,319,386 B2 | 1/2008 | Collins et al. | |
| 7,366,522 B2 | 4/2008 | Thomas | |

(Continued)

OTHER PUBLICATIONS

U.S. Appl. No. 12/256,359; Final Rejection dated Sep. 13, 2011; 13 pages.

(Continued)

*Primary Examiner* — Amancio Gonzalez
(74) *Attorney, Agent, or Firm* — Swanson & Bratschun, L.L.C.

(57) ABSTRACT

Embodiments of the disclosed invention include an apparatus, method, and computer program product for providing location information for a mobile device associated with a passenger of a mass transportation vehicle. For example, in some embodiments, the location information of a mobile device of a passenger may be utilized to provide location-based services, such as, but not limited to, providing the passenger with updated information regarding a travel arrangement, enabling an airline crew to determine the whereabouts of a passenger, and enabling automatic check-in. In addition, certain ones of the disclosed embodiments provide a method for maintaining location-based services associated with a mobile device while the device is in transit on a mass transportation vehicle, such as, but not limited to, an airplane.

16 Claims, 5 Drawing Sheets

U.S. PATENT DOCUMENTS

| | | | |
|---|---|---|---|
| 7,382,895 | B2 | 6/2008 | Bramblet et al. |
| 7,386,595 | B1 | 6/2008 | Bloomer et al. |
| 7,426,197 | B2 | 9/2008 | Schotten et al. |
| 7,433,648 | B2 | 10/2008 | Bridgelall |
| 7,454,203 | B2 * | 11/2008 | Levitan .................... 455/431 |
| 7,460,020 | B2 | 12/2008 | Reyes et al. |
| 7,495,551 | B2 | 2/2009 | Waxman et al. |
| 7,495,562 | B2 | 2/2009 | Monroe |
| 7,504,940 | B2 | 3/2009 | Luebke et al. |
| 7,505,607 | B2 | 3/2009 | Meunier et al. |
| 7,515,043 | B2 | 4/2009 | Welch et al. |
| 7,554,446 | B2 | 6/2009 | Ciarcia et al. |
| 7,561,019 | B2 | 7/2009 | Sasakura et al. |
| 7,592,909 | B2 | 9/2009 | Zaruba et al. |
| 7,634,283 | B2 | 12/2009 | Luebke |
| 7,671,728 | B2 | 3/2010 | Buehler |
| 7,693,512 | B1 | 4/2010 | West |
| 7,739,340 | B2 | 6/2010 | Arenburg et al. |
| 7,751,829 | B2 | 7/2010 | Masuoka et al. |
| 7,801,975 | B2 | 9/2010 | Stykes |
| 7,844,055 | B2 | 11/2010 | Mukherjee et al. |
| 7,898,419 | B2 | 3/2011 | Cristache |
| 7,984,105 | B2 | 7/2011 | Griffin |
| 8,040,219 | B2 | 10/2011 | Haartsen et al. |
| 8,041,586 | B2 | 10/2011 | Jethani et al. |
| 8,064,928 | B2 * | 11/2011 | Venkatachalam .......... 455/456.3 |
| 8,102,238 | B2 | 1/2012 | Golander et al. |
| 2001/0001239 | A1 | 5/2001 | Stewart |
| 2002/0077077 | A1 | 6/2002 | Rezvani et al. |
| 2002/0091569 | A1 | 7/2002 | Kitaura et al. |
| 2002/0104012 | A1 | 8/2002 | Xydis |
| 2002/0156787 | A1 | 10/2002 | Jameson et al. |
| 2002/0193973 | A1 * | 12/2002 | Kinoshita et al. ................. 703/1 |
| 2003/0197612 | A1 | 10/2003 | Tanaka et al. |
| 2003/0210148 | A1 | 11/2003 | Imasaki et al. |
| 2005/0206518 | A1 | 9/2005 | Welch et al. |
| 2005/0280535 | A1 | 12/2005 | Gary, Jr. |
| 2006/0015376 | A1 | 1/2006 | Sattler et al. |
| 2006/0015491 | A1 | 1/2006 | Lee et al. |
| 2006/0031326 | A1 | 2/2006 | Ovenden |
| 2006/0063540 | A1 | 3/2006 | Beuck |
| 2006/0075038 | A1 | 4/2006 | Mason et al. |
| 2006/0105751 | A1 | 5/2006 | Bloom |
| 2006/0230137 | A1 | 10/2006 | Gare et al. |
| 2006/0270419 | A1 | 11/2006 | Crowley et al. |
| 2006/0278702 | A1 | 12/2006 | Sakai |
| 2007/0001835 | A1 | 1/2007 | Ward et al. |
| 2007/0001841 | A1 | 1/2007 | Anders et al. |
| 2007/0069884 | A1 | 3/2007 | Waxman |
| 2007/0096871 | A1 | 5/2007 | Mason et al. |
| 2007/0100704 | A1 | 5/2007 | Liu et al. |
| 2007/0136140 | A1 | 6/2007 | Smith |
| 2007/0162315 | A1 | 7/2007 | Hodges |
| 2007/0273474 | A1 | 11/2007 | Levine |
| 2007/0286378 | A1 | 12/2007 | Brown et al. |
| 2008/0059254 | A1 | 3/2008 | Vivadelli et al. |
| 2008/0068162 | A1 | 3/2008 | Sharma et al. |
| 2008/0129444 | A1 | 6/2008 | Nashimi |
| 2008/0162198 | A1 | 7/2008 | Jabbour et al. |
| 2008/0182590 | A1 | 7/2008 | Ruckart et al. |
| 2008/0195457 | A1 | 8/2008 | Sherman et al. |
| 2008/0287142 | A1 | 11/2008 | Keighran |
| 2008/0291013 | A1 | 11/2008 | McCown et al. |
| 2009/0022131 | A1 * | 1/2009 | Rusanen et al. .............. 370/338 |
| 2009/0058638 | A1 | 3/2009 | Kanaglia et al. |
| 2009/0106077 | A1 | 4/2009 | Bhogal et al. |
| 2009/0119400 | A1 | 5/2009 | Fukazawa |
| 2009/0163224 | A1 | 6/2009 | Dean et al. |
| 2009/0186611 | A1 * | 7/2009 | Stiles et al. ................... 455/431 |
| 2009/0219156 | A1 | 9/2009 | August et al. |
| 2009/0237203 | A1 | 9/2009 | Determan et al. |
| 2009/0273441 | A1 | 11/2009 | Mukherjee |
| 2009/0298514 | A1 | 12/2009 | Ullah |
| 2010/0090827 | A1 | 4/2010 | Gehrke et al. |
| 2010/0097214 | A1 | 4/2010 | Sweeney et al. |
| 2010/0106748 | A1 | 4/2010 | Schultz et al. |
| 2010/0109864 | A1 | 5/2010 | Haartsen et al. |
| 2010/0114613 | A1 | 5/2010 | Smith et al. |
| 2010/0146499 | A1 | 6/2010 | Bush et al. |
| 2010/0151821 | A1 | 6/2010 | Sweeney et al. |
| 2010/0267399 | A1 | 10/2010 | Sweeney et al. |
| 2010/0273509 | A1 | 10/2010 | Sweeney et al. |
| 2010/0277315 | A1 | 11/2010 | Cohn et al. |
| 2010/0283579 | A1 | 11/2010 | Kraus et al. |
| 2010/0318615 | A1 | 12/2010 | Griffin |
| 2011/0010218 | A1 | 1/2011 | Gupta |
| 2011/0128145 | A1 | 6/2011 | Todd et al. |

OTHER PUBLICATIONS

U.S. Appl. No. 12/256,359; Non-Final Rejection dated Mar. 18, 2011; 12 pages.
U.S. Appl. No. 12/332,537; Final Rejection dated Nov. 9, 2011; 20 pages.
U.S. Appl. No. 12/332,537; Non-Final Rejection dated Apr. 27, 2011; 19 pages.
U.S. Appl. No. 12/424,178 Non-Final Rejection dated Jul. 1, 2011; 15 pages.
U.S. Appl. No. 12/424,178; Final Office Action dated Dec. 28, 2011; 20 pages.
U.S. Appl. No. 12/424,178; Notice of Panel Decision from Pre-Appeal Brief Review dated May 3, 2012; 2 pages.
U.S. Appl. No. 12/499,412; Requirement for Restriction/Election dated Apr. 27, 2012; 7 pages.
U.S. Appl. No. 12/256,359; Non-Final Rejection dated May 24, 2012; 35 pages.
U.S. Appl. No. 12/256,359; Final Rejection dated Dec. 11, 2012; 35 pages.
U.S. Appl. No. 12/499,412; Non-Final Rejection dated Sep. 26, 2012; 35 pages.
U.S. Appl. No. 12/332,537; Non-Final Rejection dated Feb. 15, 2013; 46 pages.
U.S. Appl. No. 12/424,178 Non-Final Rejection dated Mar. 18, 2013; 43 pages.

* cited by examiner

MASS TRANSPORTATION SERVICE DELIVERY PLATFORM

BACKGROUND OF THE INVENTION

The disclosed invention is related to the field of mobile communications and to the field of location-based service (LBS). A location-based service is an information and entertainment service, accessible with mobile devices through the mobile network and utilizing the ability to make use of the geographical position of the mobile device. Location-based services include services to identify a location of a person or object, such as discovering the nearest banking cash machine, parcel tracking, personalized weather services, and even location-based games.

SUMMARY

Embodiments of the disclosed invention include an apparatus, method, and computer program product for providing location information for a mobile device associated with a passenger of a mass transportation vehicle. For example, in some embodiments, the location information of a mobile device of a passenger may be utilized to provide location-based services, such as, but not limited to, providing the passenger with updated information regarding a travel arrangement, enabling an airline crew to determine the whereabouts of a passenger, and enabling automatic check-in. In addition, certain ones of the disclosed embodiments provide a method for maintaining one or more location-based services associated with a mobile device while the mobile device is in transit on a mass transportation vehicle, such as, but not limited to, an airplane.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed invention is related to the field of mobile communications and to the field of location-based services. As previously stated, many types of location-based services currently exist including, but not limited to, informing a person of their location and providing weather and/or traffic information. Generally, these location-based services rely on Global Positioning System (GPS) coordinates (for GPS equipped devices) and/or cellular triangulation for obtaining the location of the mobile device. Cellular triangulation is a process by which the location of a radio transmitter (e.g., cellular phone) can be determined by measuring either the radial distance, or the direction, of the received signal from two or three different cell towers.

However, the disclosed embodiments recognize several limitations associated with currently existing location-based technology. For example, the disclosed embodiments recognize that location-based services that rely on obtaining real time coordinates of mobile devices may not function properly if a user/mobile device is traveling at a high rate of speed (e.g., over 200 mph), such as, but not limited to, when the mobile device is on an airplane. Additionally, cellular devices without GPS components will not be able to receive and/or provide location information using cellular triangulation if the mobile device is not within range of a cellular tower (e.g., when the mobile device is on a boat in the middle of the ocean). Thus, certain ones of the disclosed embodiments seek to provide a solution to one or more of the above recognized problems.

The disclosed embodiments and advantages thereof are best understood by referring to FIGS. 1-5 of the drawings, like numerals being used for like and corresponding parts of the various drawings. Other features and -advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, or process in which different embodiments may be implemented.

Figure 1:
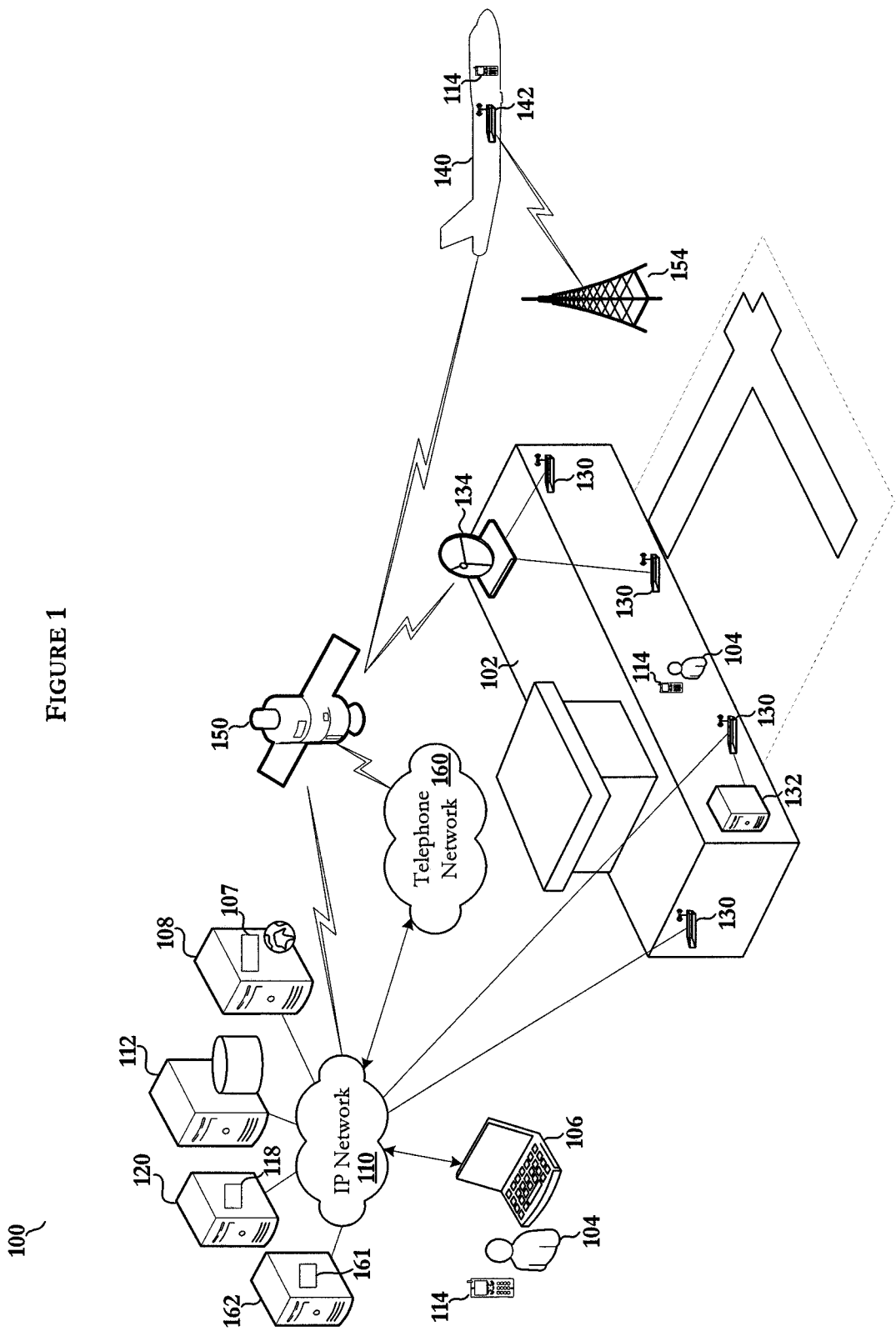
FIG. 1 depicts an embodiment a network environment in which the illustrative embodiments may be implemented.

FIG. 1 depicts an embodiment of a network environment 100 in which the illustrative embodiments may be implemented. In accordance with one embodiment, the present invention may be utilized at a mass transportation facility 102. Mass transportation facility 102 is a location, building, and/or area associated with a mass transportation mode of travel, such as, but not limited to, an airplane, train, or a ship (e.g., an airport, train station, and a cruise ship docking port/station). In one embodiment, a user 104 may make travel arrangements online using a computer, such as, laptop 106, to communicate with, via an IP network 110, a travel website 107 hosted by a web server 108. Alternatively, in other embodiments, user 104 may make travel arrangements using any other suitable means, such as, but not limited to, calling a direct service provider and/or calling a travel agent.

In one embodiment, IP network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, IP network 110 may include other types of data networks, such as, but not limited to, an intranet, a private local area network (LAN), a wide area network (WAN), and a wireless local area network (WLAN).

Additionally, in some embodiments, web server 108 may communicate with one or more data processing systems and/or databases, such as, but not limited to, a reservation system 112. In certain embodiments, reservation system 112 may store the schedules (e.g., flight schedules), availability, pricing, and other data associated with providing travel related information to web server 108. In addition, in some embodiments, reservation system 112 may store reservation and traveler information associated with travel arrangements made through website travel 107.

In accordance with certain of the disclosed embodiments, as part of the process of making the travel arrangements, one or more mobile devices associated with the traveler, such as, but not limited to, mobile device 114, may be associated with the travel arrangements for the purpose of providing location-based services, such as, but not limited to, monitoring the location of mobile device 114 in mass transportation facility 102 (e.g., to provide the traveler with location-based advertisements; inform the traveler of loading time, departure time, gate changes; and/or to inform the traveler that he is heading in the wrong direction). In one embodiment, mobile device 114 may be a regular cellular phone. Alternatively, in some embodiments, mobile device 114 may be a smart phone or a personal digital assistant (PDA) (e.g., a Blackberry® device) with cellular capabilities. Additionally, in some embodiments, mobile device 114 may include Wi-Fi capabilities for sending and receiving data wirelessly.

In accordance with one embodiment, web server 108 may communicate with a mass transportation tracking application 118 executing on an application server 120 for providing the tracking features and other location-based services. In some embodiments, mass transportation tracking application 118 may receive information from one or more mobile signal detection units 130 placed about mass transportation facility 102 for determining whether a registered mobile device associated with a passenger is located within mass transportation facility 102. For example, in some embodiments, mobile signal detection units 130 may be femto cells. A femto cell is a small portable low power mobile phone base station that connects to a mobile operator's network using a broadband connection, such as, DSL, cable, or fiber optic, for improving mobile coverage in areas with limited and/or obstructed cellular coverage. Alternatively, any suitable device capable of detecting cellular signals, such as, but not limited to, to pico-cell, may be utilized.

In some embodiments, mobile signal detection units 130 may be communicatively coupled via a landline connection to IP network 110 for communicating data to application server 120. Alternatively, in some embodiments, the set of mobile signal detection units 130 may broadcast and receive information via a satellite receiver 134 for communicating with application server 120. Further, in some embodiments, one or more of the mobile signal detection units 130 may communicate with a local data processing system, such as, data processing system 132 for enabling communication and processing of data to and from one or more network devices, such as, but not limited to, application server 120.

In accordance with some embodiments, mobile signal detection units 130 may also be utilized to determine a precise and/or approximate location of the registered mobile device within mass transportation facility 102. For example, in accordance with some embodiments, an airline agent may utilize a data processing system to communicate with mass transportation tracking application 118 to determine the location of a passenger that has not checked in for a scheduled flight. In one embodiment, mass transportation tracking application 118 may return a location status associated with a passenger as detected or not detected within mass transportation facility 102. In other embodiments, mass transportation tracking application 118 may return a more precise location status of the queried passenger, such as, a particular location within mass transportation facility 102 based on a location of a mobile signal detection unit 130 that detects a wireless signal associated with the passenger's mobile device. Alternatively, in some embodiments, an automated flight manifest application may communicate with mass transportation tracking application 118 to monitor and update a flight manifest with the locations of passengers. For instance, if the automated flight manifest application indicates that a dozen passengers are within a couple minutes of the departing gate, the flight crew may desire to wait for the dozen passengers instead of departing without them. In addition, in one embodiment, mass transportation tracking application 118 may communicate with an airline system to provide automated check-in (e.g., if the traveler is detected in the waiting area of a departure gate). In some embodiments, the airline system may transmit back a confirmation message that may include a scannable bar code and/or a confirmation number/code for enabling a passenger to use the confirmation message as a boarding pass.

Additionally, in some embodiments, one or more mobile signal detection units 130, such as, but not limited to, a femto cell 142, may be placed onboard a mass transportation vehicle 140, such as, but not limited to, an airplane, train, or cruise ship, for providing cellular coverage and other location-based services to mobile devices located on mass transportation vehicle 140. For instance, in one embodiment, mobile device 114 homes its signal to femto cell 142 upon entering mass transportation vehicle 140 (e.g., mobile device 114 switches from communicating via a macro cellular tower or a mobile signal detection unit 130 within mass transportation facility 102 to communicating via femto cell 142 for enabling cellular service to mobile device 114).

In some embodiments, femto cell 142 may be configured to communicate with a satellite 150 for sending and receiving information from IP network 110 and/or from a cellular network 160. Cellular network 160 may include one or more cellular networks, such as, but not limited to, a Global System for Mobile Communications (GSM) network, a Code-Division Multiple Access (CDMA) network, an Enhanced Data GSM Environment (EDGE) network, and a 3G/4G network.

Alternatively, or in addition to, in some embodiments, femto cell 142 may be configured to communicate with one or more land base cellular towers, such as, a base transceiver station (BTS) 154. Base transceiver station 154 is a piece of equipment that facilitates wireless communication between mobile devices and a network, such as, but not limited to, cellular network 160. In some embodiments, base transceiver station 154 may be support one or more wireless communication technologies including, but not limited to, GSM, CDMA, WLL, WAN, Wi-Fi, WiMAX etc.

In accordance with one embodiment, femto cell 142 may be configured to provide location information for location-based services associated with mobile devices located on mass transportation vehicle 140, such as, but not limited to, mobile device 114. For example, in one embodiment, an application executing on mobile device 114 may attempt to communicate with a network location-based service 161 running on server 162 and periodically provide location information associated with mobile device 114 for performing one or more functions (e.g., for mapping the user's current location). As previously stated, in existing technology, mobile device 114 may not accurately and/or be able to obtain location information, either via GPS and/or cellular triangulation, as requested by the location-based service due to the high rate of speed associated with mass transportation vehicle 140 and/or other obstructions. Consequently, any application that relies on being able to determine location information of a mobile device may not function properly.

Accordingly, in certain of the disclosed embodiments, femto cell 142 and/or a back-end system, such as, but not limited to, application server 120, associated with femto cell 142 may be configured to provide location information to one or more location-based services, such as, network location-based service 161, in lieu of location information, if any, provided by mobile device 114 while communicating through femto cell 142. For example, in one embodiment, femto cell 142 may be configured to provide the same location information, such as, but not limited to, the destination location, to network location-based service 161 during the duration of the flight and return the data provided by network location-based service 161 to mobile device 114. In other embodiments, femto cell 142 may be configured to periodically provide approximate real-time location information to network location-based service 161. For instance, in one embodiment, mass transportation tracking application 118 may communicate with an airline application server for retrieving the location information of mass transportation vehicle 140 and transmitting the location information to mobile device 114 via femto cell 142. As a result, certain ones of the disclosed embodiments enable location-based service applications executing on mobile device 114 to function correctly during transport on a mass transportation vehicle.

In addition, in some embodiments, femto cell 142, if permitted, may enable a user to utilize mobile device 114 to make and/or receive cellular calls on board mass transportation vehicle 140. In some embodiments, femto cell 142 and/or a back-end billing system may track the amount wireless usage handled by femto cell 142 for billing user 104. Additionally, in some embodiments, femto cell 142 may be utilized to stream data, such as, but not limited to, advertisements and/or movies to mobile device 114 for enabling video services to individual passengers. Alternatively, or in addition to, in some embodiments, femto cell 142 may be utilized to block wireless services to mobile devices, such as, but not limited to, cellular signals and/or Wi-Fi signals, during particular times, such as, but not limited to, during takeoff and/or landing.

Additionally, in accordance with some embodiments, a user may configure mass transportation tracking application 118 to automatically answer incoming calls to a user-specified cellular number. For instance, in one embodiment, all incoming calls to mobile device 114 during flight may be routed by mass transportation tracking application 118 to a voicemail system that is communicatively coupled to a back-end system that contains travel related information (e.g., flight information) for playing a message to the caller to inform the caller of user 104's current location. For example, in one embodiment, a message may be played to the caller to inform the caller that user 104 is on flight 321 and is expected to land at terminal A at Los Angeles International Airport in 35 minutes. Thus, a family or coworker can easily check on user 104's travel status by simply calling mobile device 114.

Additionally, in some embodiments, one or more mobile signal detection units 130 may be placed at a destination mass transportation facility for identify the arrival and location of a user. For example, in one embodiment, upon arriving at a destination airport, mass transportation tracking application 118 may communicate with an airline data processing system to determine the particular baggage claim for enabling user 104 to retrieve his checked-in items. For instance, in some embodiments, mass transportation tracking application 118 may transmit an SMS text message and/or an email to mobile device 114 to inform user 104 of the baggage claim carousel that his check-in items will be located on. In addition, in some embodiments, mass transportation tracking application 118 may be configured to send a message to a user-specified identifier, such as, but not limited to, a phone number and/or email address, indicating that user 104 has arrived (e.g., to automatically notify a friend and/or hotel/rental car shuttle bus that user 104 has arrived and for them to come to the drop off/pick-up location). In some embodiments, the message may include location information associated with user 104 based on the location of the mobile signal detection unit 130 detecting the signal associated with mobile device 114 (e.g., the message may indicate that user 104 is waiting by exit 3 of terminal A).

Figure 2:
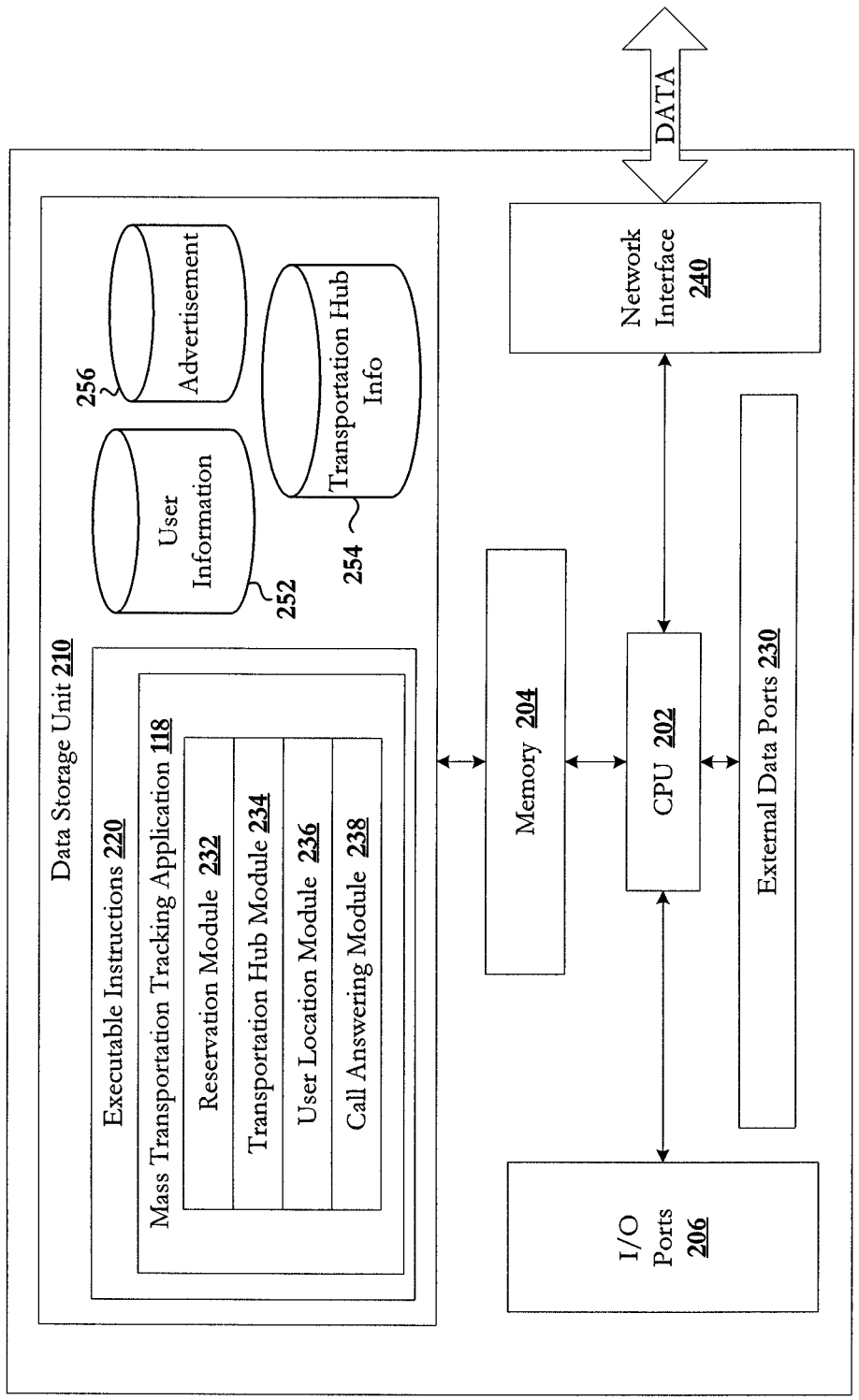
FIG. 2 depicts an embodiment of a location tracking apparatus in accordance with the illustrative embodiments.

With reference now to FIG. 2, an embodiment of application server 120 is presented. In one embodiment, application server 120 may include, among other components, a processing unit 202, memory 204, and at least one data storage unit 210. Processing unit 202 serves to execute computer executable instructions stored in memory 204 and/or data storage unit 210. In one embodiment, processing unit 202 may include one or more processing cores, such as, but not limited to, a microcontroller, microprocessor, or digital signal processor, for executing instructions and processing data associated with the functions and features provided by application server 120.

In addition, in one embodiment, memory 204 may be volatile memory. Volatile memory is memory that requires power to maintain stored information. For example, in some embodiments, memory 204 may be random access memory (RAM). Random access memory stores currently executing instructions and/or other data utilized by an operating system, software application and/or hardware device.

Additionally, in some embodiments, data storage unit 210 may be non-volatile memory, such as, but not limited to, a hard disk drive, for storing data. For example, in some embodiments, data storage unit 210 may store computer executable instructions 220 and/or other data. In some embodiments, computer executable instructions 220 may include executable instructions associated with mass transportation tracking application 118 and/or other applications executed on application server 120. In addition, in some embodiments, data storage unit 210 may include one or more databases, such as, but not limited to, a user information database 252, a transportation hub information database 254, and an advertisement database 256. Alternatively, in some embodiments, the depicted databases may be stored on one or more remote systems.

In some embodiments, application server 120 may also include one or more external data ports 230. For example, in one embodiment, external data ports 230 may include a universal serial bus (USB) port for connecting one or more USB devices to application server 120, such as, but not limited to, a USB flash drive for providing external data storage. In addition, in some embodiments, application server 120 may include one or more input/output (I/O) ports 206. In one embodiment, input/output ports 206 may include communication ports for coupling one or more input/output device to application server 120, such as, but not limited to, a monitor, a keyboard, and a mouse. Further, in some embodiments, application server 120 may include a network interface 240. For example, in one embodiment, network interface 240 may be a network interface card, such as, but not limited to, an Ethernet card for connecting application server 120 to a network, such as, but not limited to, IP network 110.

In accordance with one embodiment, mass transportation tracking application 118 may include a reservation module 232. In one embodiment, reservation module 232 may comprise computer executable instructions for associated a user's mobile device with a user's reservation information. For instance, in one embodiment, reservation module 232 may communicate with reservation system 112 to retrieve a user's travel itinerary, extract information from the user's itinerary (e.g., airport information, flight information, lodging, etc.), establish communication with the mobile signal detection units 130 located at the mass transportation facility associated with the user's itinerary, and pass the user's cellular number to the mobile signal detection units 130 for identifying the user's mobile device when in signal range of one of the mobile signal detection units 130.

In addition, in some embodiments, mass transportation tracking application 118 may include a transportation hub module 234. For example, in one embodiment, transportation hub module 234 may comprise computer executable instructions for monitoring and updating a location of a user's mobile device while within a mass transportation facility. For example, in one embodiment, transportation hub module 234 may update a user's location status as either one of 1) not detected within a mass transportation facility, 2) detected within a mass transportation facility, or 3) detected in waiting area of departure gate. In one embodiment, an airline personnel may query a passenger's name and/or cellular number for determining whether the passenger is located in the terminal. In other embodiments, transportation hub module 234 may communicate with a flight manifest application for automatically updating the location information of passengers on the flight manifest. Additionally, in one embodiment, transportation hub module 234 may retrieve data from transportation hub information database 254 to determine shops/restaurants located nearby a user's determined location. In these embodiments, transportation hub module 234 may retrieve applicable advertisements from advertisement database 256 and transmit them to mobile device 114.

In some embodiments, mass transportation tracking application 118 may also include a user location module 236. In one embodiment, user location module 236 may comprise computer executable instructions for communicating location information to one or more location-based services associated with a registered mobile device, such as, but not limited to, when the mobile device is transmit on mass transportation vehicle 140. For instance, in one embodiment, a user may specify one or more location-based services application running on a user's mobile device for enabling mass transportation tracking application 118 to communicate with the appropriate network server associated with the location-based service for providing the location of the mobile device while in transit. Alternatively, in some embodiments, user location module 236 may comprise computer executable instructions for automatically determining the location-based services application running on a user's mobile device based on the target destination address of a data packet. In addition, in one embodiment, user location module 236 may communicate with a data processing system associated with mass transportation vehicle 140 via IP network 110 for obtaining the real time and/or approximate location of mass transportation vehicle 140 for providing the location information to the one or more location-based services.

Additionally, in some embodiments, mass transportation tracking application 118 may also include a call module 238. In one embodiment, call module 238 may comprise computer executable instructions for answering incoming calls to registered mobile devices while the mobile device is detected on board a mass transportation vehicle. For instance, in one embodiment, incoming calls to mobile devices on mass transportation vehicle 140 (i.e., calls that are routed to femto cell 142) are rerouted to application server 120. In one embodiment, call answering module 238 may retrieve and provide incoming callers with flight information, such as, but not limited to, flight number, destination location, and arrival time. For example, in some embodiments, the flight information may be stored locally, such as, in user information database 252. Alternatively, call module 238 may communicate with a remote network system for retrieving the flight information. In addition, in some embodiments, call module 238 may include computer executable instructions for enabling a user to configure mass transportation tracking application 118 to send an email and/or SMS notification to a user-specified identifier (i.e., email address and/or phone number) for notifying a desired person of the user's location. For example, in some embodiments, the user may configure mass transportation tracking application 118 to notify the desired person at a user-specified time based on a user's location (e.g., approximately 30 minutes before landing or at the time of arrival).

Figure 3:
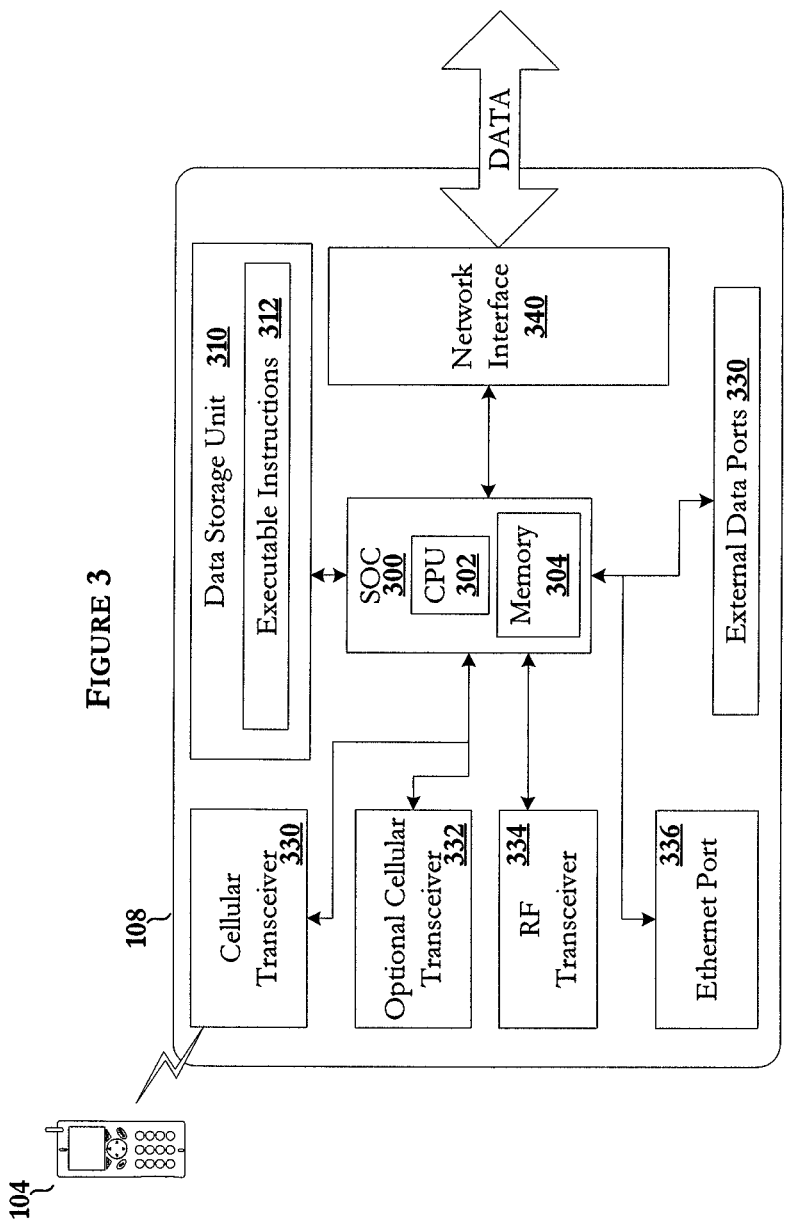
FIG. 3 depicts an embodiment of a mobile signal detection unit in accordance with the illustrative embodiments.

FIG. 3 depicts an embodiment of a mobile signal detection unit 130 in accordance with certain ones of the disclosed embodiments. For example, in some embodiments, mobile signal detection unit 130 may include a system-on-a-chip (SoC) 300. In one embodiment, SoC 300 may integrate all or a majority of the components of mobile signal detection unit 130, such as, but not limited to, one or more processors/microprocessor 302 and memory 304 (e.g., RAM), into a single integrated circuit chip.

In addition, in some embodiments, mobile signal detection unit 130 may include one or more data storage unit 310, such as, but not limited to, a hard disk drive for storing executable instructions 312 and/or other data. For example, in some embodiments, executable instructions 312 may include executable instructions for receiving, from mass transportation tracking application 118, via a network interface 340, a user's travel information and mobile identification number (MIN) or International Mobile Equipment Identity (IMEI) associated with a mobile device of the user. In one embodiment, mobile signal detection units 130 may store the user's information locally in data storage unit 310. In addition to, in some embodiments, mobile signal detection units 130 may include one or more external data ports 330 (e.g., a USB port) for transferring and/or storing data on an external data storage unit and/or for connecting mobile signal detection units 130 to an external device.

In accordance with one embodiment, mobile signal detection unit 130 may include a cellular transceiver 330 for sending and receiving cellular signals. In some embodiments, cellular transceiver 330 may be configured to send and receive cellular signals associated with a particular cellular service provider. Alternatively, in some embodiments, cellular transceiver 330 may be configured to send and receive cellular signals associated with a particular type of cellular network, such as, but not limited to, a Global System for Mobile communications (GSM) network, 2G/3G/4G networks, and/or a Code Division Multiple Access (CDMA) network. Optionally, in some embodiments, mobile signal detection unit 130 may include multiple cellular transceivers, such as, optional cellular transceiver 332. For instance, in some embodiments, optional cellular transceiver 332 may be configured to operate on a different cellular network type and/or a different cellular service provider than that associated with cellular transceiver 330.

In addition, in some embodiments, mobile signal detection unit 130 may include a radio frequency (RF) transceiver 334. In one embodiment, radio frequency transceiver 334 supports the Wireless Application Protocol (WAP) for enabling wirelessly data communication with one or more devices, such as, but not limited to, a laptop computer and/or a PDA device with Wi-Fi capabilities. Additionally, in some embodiments, mobile signal detection unit 130 may include an Ethernet port 326 for enabling a device/data processing system to physically connect to mobile signal detection unit 130.

In accordance with one embodiment, mobile signal detection units 130 may be configured to communicate, on a control channel, with cellular devices that are within signal range of mobile signal detection unit 130 to determine the mobile identification number/cellular phone number associated with the detected mobile devices. A control channel is a logic channel carrying network information rather than the actual voice or data messages transmitted over the network. The control channel enables cellular devices to identify themselves and their location to the cellular networks. Additionally, in some embodiments, mobile signal detection units 130 may be configured to enable wireless devices within signal range to route communications through mobile signal detection units 130 instead of a macro cellular network.

In accordance with one embodiment, in response to identifying a registered mobile device associated with a traveler, mobile signal detection units 130 may transmit the location information of the identified mobile device to mass transportation tracking application 118. In some embodiments, mass transportation tracking application 118 updates the user's location status and may send the user, via mobile signal detection units 130 or via the macro cellular networks, location-based information, such as, but not limited to, advertisements for shops/restaurants located within mass transportation facility 102 and/or flight information. As referenced herein, flight information may include gate number, flight delays, an indication that a flight is now boarding, a standby or upgrade request has been approved or denied, a gate change, and/or a flight has been canceled.

In addition, in some embodiments, mobile signal detection units 130 may contain data and/or instructions for identifying communication requests between a registered mobile device and one or more location-based services. In one embodiment, mass transportation tracking application 118 may be configured to route the identified location-based services requests to mass transportation tracking application 118 (e.g., when the mobile device is on mass transportation vehicle 140). In these embodiments, mass transportation tracking application 118 may be configured to provide location information to the one or more location-based services and return the location-based services data to the registered mobile device via mobile signal detection units 130.

Figure 4:
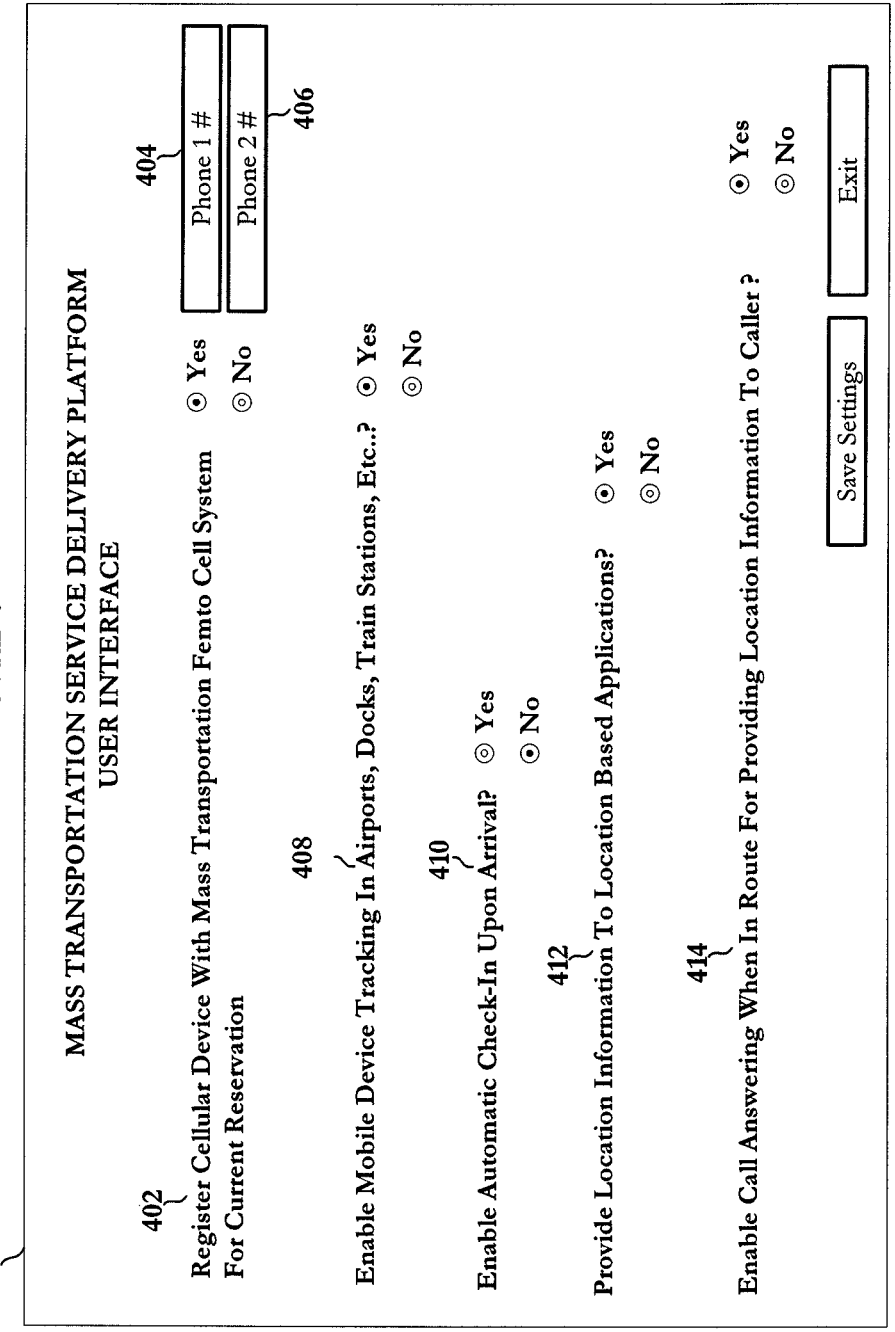
FIG. 4 depicts an embodiment of a user interface that may be utilized to configure features associated with certain ones of the disclosed embodiments.

FIG. 4 depicts an embodiment of a user interface 400 that may be utilized by a user to configure certain features associated with an embodiment of mass transportation tracking application 118. For example, in one embodiment, user interface 400 may include an option 402 for enabling a user to register one or more mobile devices with mass transportation tracking application 118. For instance, in one embodiment, a user may enter one or more cellular numbers in text box 404 and text box 406. In some embodiments, mass transportation tracking application 118 may communicate with a wireless service provider network to ensure that the registered user is a subscriber associated with the registered cellular numbers.

Additionally, in some embodiments, user interface 400 may include user-specific options, such as, option 408, for enabling a user to enable mass transportation tracking application 118 to monitor the location of the registered mobile devices while located in a mass transportation facility. For example, in some embodiments, (not depicted), the user may specify whether the location-based advertisements may be sent to the registered mobile devices. In some embodiments, a user may enable option 410 for enabling mass transportation tracking application 118 to communicate with a respective airline system for automatically checking-in the user in response to detecting the presence of the user in the respective mass transportation facility or in a particular area of the respective mass transportation facility.

In addition, in some embodiments, user interface 400 may include an option 412 for enabling mass transportation tracking application 118 to provide location information to one or more location-based services. In one embodiment, (not depicted), a user may specify and/or select from a list of location-based service associated with the registered mobile devices of the user. Alternatively, in some embodiments, mass transportation tracking application 118 may automatically provide location information for all location-based services requests detected by mobile signal detection units 130.

Further, in some embodiments, user interface 400 may include an option 414 for enabling mass transportation tracking application 118 to automatically answer incoming calls to registered mobile devices while the mobile device is located on a mass transportation vehicle (e.g., while the mobile device is detected on an airplane). In one embodiment, a user may specify mass transportation tracking application 118 to provide travel information to the calling party, such as, but not limited to, the flight number, time of arrival, arrival gate, etc. In other embodiments, (not depicted), a user may designate that only certain incoming calls associated with one or more user provided numbers may receive the user's location information.

Figure 5:
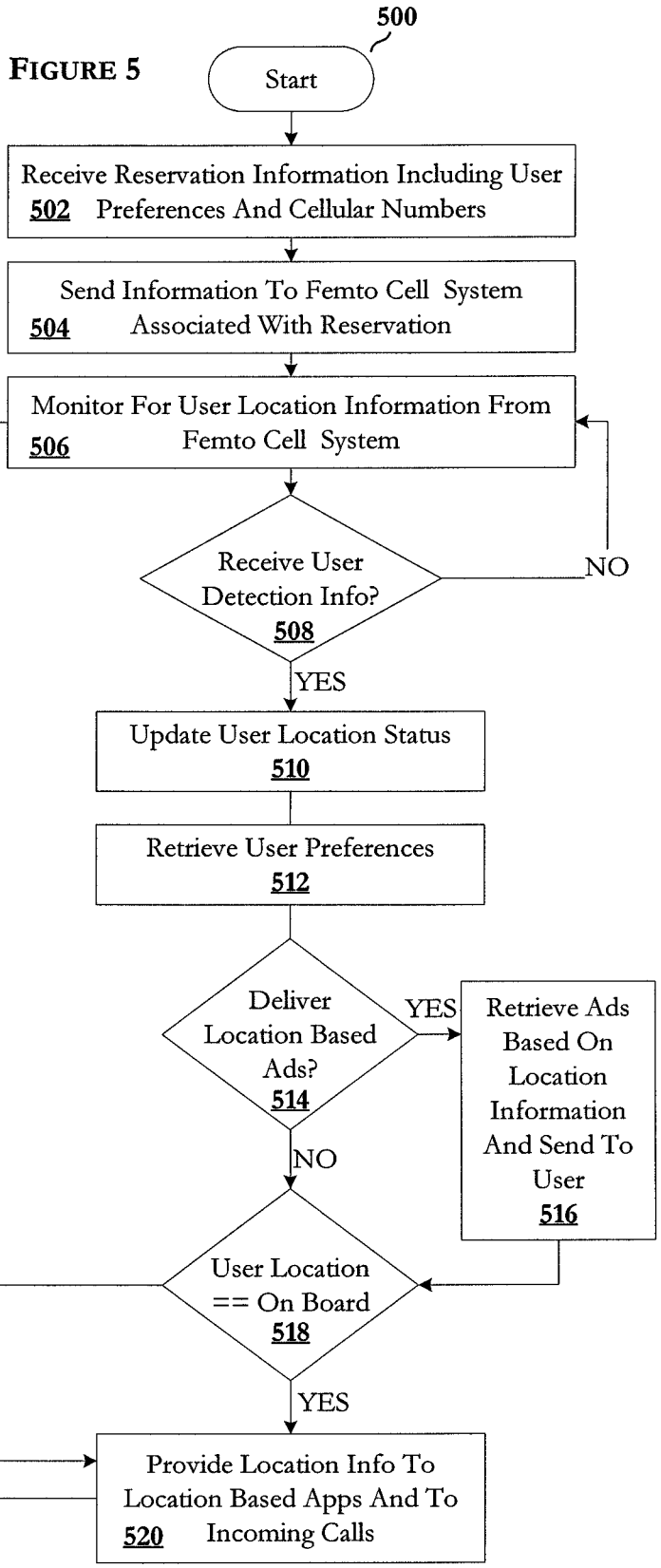
FIG. 5 illustrates a flowchart depicting an embodiment of a process for providing location information for a mobile device associated with a traveler.

FIG. 5 illustrates a flowchart depicting an embodiment of a process 500 for providing location information for a mobile device associated with a user/traveler. Process 500 may be executed by one or more data processing systems, such as, but not limited to, application server 120. In accordance with one embodiment, process 500 begins by receiving reservation information associated with a user. For example, in one embodiment, the reservation information may include, but is not limited to, a travel itinerary, one or more cellular phone numbers associated with the user, and one or more user specified preferences for providing location-based information/services to the user. At step 502, the process sends data, such as, but not limited to, the one or more registered cellular phone numbers, to a mobile detection system located at a mass transportation facility associated with the user's travel itinerary. For example, in one embodiment, the mobile detection system may comprise one or more mobile signal detection units 130. In addition, in some embodiments, the mobile detection system may include one or more data processing systems associated with the mobile signal detection units 130.

At step 506, the process monitors for the receipt of user location information from the mobile detection system. For example, in one embodiment, in response to a mobile signal detection unit 130 detecting the presence of a registered mobile device, the mobile detection system may send the location information associated with the detected mobile device to mass transportation tracking application 118. In response to receiving a user's location information at step 508, the process updates a user's location status at step 510.

In one embodiment, in response to detecting the presence of a user within a mass transportation facility, the process may retrieve the user's preferences at step 512. For example, in one embodiment, the process, at step 514, may determine that the user preferences indicate that the user desires to receive location-based advertisements for shops/restaurants located in the mass transportation facility. In these embodiments, the process may, at step 516, retrieve one or more advertisements based on the user's location information and transmit the received advertisements to the user's registered mobile device.

At step 518, the process continues to monitor the location information associated with the user's registered mobile device to determine whether a user/mobile device has boarded a mass transportation vehicle. In response to a determination that the user/mobile device is located on a mass transportation vehicle, the process, at step 520, monitors for communication between the registered mobile devices and one or more location-based services for providing location information to the location-based services. Additionally, in some embodiments, the process, at step 520, may monitor for incoming calls to one or more registered mobile devices for providing automated call answering (e.g., to provide travel related information to the caller). In one embodiment, the process repeats step 520 until a determination is made, at step 522, that the user/mobile device has deboarded the mass transportation vehicle. In response to determining that the user/mobile device has left the mass transportation vehicle, the process, at step 524, updates the user's location status. Additionally, in some embodiments, the process at step 526, may notify one or more user-specified parties of the user's arrival, with process 500 terminating thereafter.

Accordingly, the disclosed embodiments provide a solution to one or more of the above recognized problems associated with currently existing location-based technology by providing location information for mobile devices of passengers of a mass transportation vehicle. As will be appreciated by one skilled in the art, certain aspects of the disclosed embodiments may be embodied as an apparatus, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A computer implemented method for providing location information for a mobile device associated with a passenger of a mass transportation vehicle, the computer implemented method comprising:

receiving travel related information associated with the passenger;

receiving an identifier associated with the mobile device of the passenger;

monitoring for the presence of the mobile device in a departing mass transportation facility associated with the travel related information using one or more mobile signal detection units; and communicating with a data processing system associated with a mass transportation service provider to automatically check in the passenger in response to a determination that the passenger is in the departing mass transportation facility based on the presence of the mobile device of the user being in the departing mass transportation facility; and communicating with the data processing system to update a flight manifest with a location of the passenger within the departing mass transportation facility to indicate an amount of time before the passenger reaches a departing gate for the mass transportation vehicle;

transmitting a check-in confirmation message to the mobile device, in response to automatically checking in the passenger, the confirmation message including a scannable bar code that is utilized to board the mass transportation vehicle.

2. The computer implemented method of claim 1, further comprising:

transmitting one or more advertisements to the mobile device based on a location of the mobile device within the departing mass transportation facility.

3. The computer implemented method of claim 1, further comprising:

receiving a query request for location information associated with the passenger from a requesting device; and returning the location status of the passenger to the requesting device.

4. The computer implemented method of claim 1, further comprising:
   determining whether the mobile device is aboard the mass transportation vehicle using one or more mobile signal detection units located on the mass transportation vehicle; and
   responsive to a determination that the mobile device is located aboard the mass transportation vehicle, monitoring for communication requests for location information from one or more location-based services associated with the mobile device;
   responsive to identifying a communication requests for location information associated with the mobile device from a location-based service, transmitting location data associated with the mobile device to the location-based service; and
   returning the location-based service data to the mobile device.

5. The computer implemented method of claim 4, wherein the one or more mobile signal detection units located on the mass transportation vehicle are femto cells.

6. The computer implemented method of claim 4, wherein the location-based services utilized by the mobile device are pre-specified by the passenger.

7. The computer implemented method of claim 4, wherein the one or more mobile signal detection units located on the mass transportation vehicle enable cellular communication by routing cellular calls to and from the mobile device through the one or more mobile signal detection units.

8. The computer implemented method of claim 4, wherein the one or more mobile signal detection units located on the mass transportation vehicle may be utilize to block all use of wireless devices located on the mass transportation vehicle.

9. The computer implemented method of claim 4, wherein the one or more mobile signal detection units located on the mass transportation vehicle provide wireless data services to the mobile device.

10. The computer implemented method of claim 1, further comprising:
    determining whether the mobile device is aboard the mass transportation vehicle using one or more mobile signal detection units located on the mass transportation vehicle; and
    responsive to a determination that the mobile device is located aboard the mass transportation vehicle, monitoring for incoming calls to the mobile device; and
    automatically answering an incoming call with a greeting message that includes all or a part of the travel related information of the passenger.

11. The computer implemented method of claim 10, further comprising:
    responsive to identifying the incoming call to the mobile device, determining a caller identification associated with the incoming call, determining whether the caller identification is included in a user-specified list of approved incoming callers; and
    responsive to the caller identification being on the user-specified list of approved incoming callers, initiating the step of automatically answering the incoming call with the greeting message that includes all or a part of the travel related information of the passenger; and
    responsive to the caller identification not being on the user-specified list of approved incoming callers, forwarding the incoming call to voicemail.

12. The computer implemented method of claim 1, further comprising:
    determining whether the mobile device is aboard the mass transportation vehicle using one or more mobile signal detection units located on the mass transportation vehicle; and
    responsive to a determination that the mobile device is located on the mass transportation vehicle, monitoring the location of the mass transportation vehicle; and
    transmitting a notification to a user-specified identifier in response to a determination that the user mass transportation vehicle is located approximately a user-specified amount of time away its destination.

13. The computer implemented method of claim 1, further comprising:
    monitoring for the detection of the mobile device in an arriving mass transportation facility associated with the travel related information using one or more mobile signal detection units, and responsive to identifying that the mobile device is located in the arriving mass transportation facility, updating a location status associated with the passenger to indicate that the passenger is within the arriving mass transportation facility.

14. The computer implemented method of claim 13, further comprising:
    communicating with a data processing system associated with a service provider of the mass transportation vehicle to retrieve baggage claim information; and
    transmitting the baggage claim information to the mobile device of the passenger.

15. A location tracking apparatus for providing location information for a mobile device associated with a passenger of a mass transportation vehicle, the location tracking apparatus comprising:
    a network interface for communicating with one or more mobile signal detection units;
    a data storage component for storing computer executable instructions; and
    a processing unit for executing the computer executable instructions to detect the presence of the mobile device in a mass transportation facility using data received from the mobile signal detection units, to communicate with a data processing system associated with a mass transportation service provider to automatically check in the passenger in response to a determination that the passenger is in the departing mass transportation facility based on detecting the presence of the mobile device of the user being in the departing mass transportation facility, to communicate with the data processing system to update a flight manifest with a location of the passenger within the departing mass transportation facility to indicate an amount of time before the passenger reaches a departing gate for the mass transportation vehicle, and to transmit a check-in confirmation message to the mobile device, in response to automatically checking in the passenger, the confirmation message including a scannable bar code that is utilized to board the mass transportation vehicle.

16. A computer program product comprising a non-transitory computer usable medium having a computer readable program code embodied therein, said computer readable program code comprising instructions to:
    monitor for the presence of a mobile device of a passenger in a mass transportation facility using one or more mobile signal detection units;
    responsive to identifying that the mobile device is located in the mass transportation facility, communicate with a data processing system associated with a mass transportation service provider to automatically check in the passenger;

communicate with the data processing system to update a flight manifest with a location of the passenger within the departing mass transportation facility to indicate an amount of time before the passenger reaches a departing gate for the mass transportation vehicle; and transmit a check-in confirmation message to the mobile device, in response to automatically checking in the passenger, the confirmation message including a scannable bar code that is utilized to board the mass transportation vehicle.

\* \* \* \* \*